US012582052B2

(12) United States Patent
Luo et al.

(10) Patent No.: US 12,582,052 B2
(45) Date of Patent: Mar. 24, 2026

(54) PLANTING BOXES

(71) Applicant: SINOWELL (SHANGHAI) CO., LTD., Shanghai (CN)

(72) Inventors: Jia Luo, Shanghai (CN); Yunfei Duan, Shanghai (CN); Junrong Yi, Shanghai (CN); Liang Zhou, Shanghai (CN); Xi Wang, Shanghai (CN)

(73) Assignee: SINOWELL (SHANGHAI) CO., LTD., Shanghai (CN)

( * ) Notice: Subject to any disclaimer, the term of this patent is extended or adjusted under 35 U.S.C. 154(b) by 177 days.

(21) Appl. No.: 18/421,943

(22) Filed: Jan. 24, 2024

(65) Prior Publication Data

US 2024/0276926 A1     Aug. 22, 2024

(30) Foreign Application Priority Data

| Feb. 21, 2023 | (CN) | .......................... | 202310141086.9 |
| Feb. 21, 2023 | (CN) | .......................... | 202320264962.2 |
| Apr. 28, 2023 | (CN) | .......................... | 202310477700.9 |
| Apr. 28, 2023 | (CN) | .......................... | 202321008649.9 |

(51) Int. Cl.
*A01G 9/26* (2006.01)
*A01G 9/24* (2006.01)

(52) U.S. Cl.
CPC .............. *A01G 9/26* (2013.01); *A01G 9/246* (2013.01); *A01G 9/247* (2013.01); *A01G 9/249* (2019.05)

(58) Field of Classification Search
CPC . A01G 13/28; A01G 9/16; A01G 9/24; A01G 9/249; A01K 63/00; A01K 63/06
See application file for complete search history.

(56) References Cited

U.S. PATENT DOCUMENTS

| 5,833,137 | A | * | 11/1998 | Liao | ..................... | A01K 63/003 |
| | | | | | | 47/62 A |
| 6,536,157 | B2 | * | 3/2003 | Wijbenga | ................. | A01G 9/16 |
| | | | | | | 47/17 |
| 8,261,485 | B2 | * | 9/2012 | Sauermann | .............. | A01G 9/16 |
| | | | | | | 47/17 |

(Continued)

FOREIGN PATENT DOCUMENTS

| CN | 202819094 U | 3/2013 | |
| CN | 103535204 A | * 1/2014 | ............. A01G 13/26 |

(Continued)

OTHER PUBLICATIONS

First Office Action in Chinese Application No. 202310477700.9 mailed on Jul. 16, 2025, 34 pages.

(Continued)

*Primary Examiner* — Monica L Perry
(74) *Attorney, Agent, or Firm* — METIS IP LLC

(57) ABSTRACT

The present disclosure provides a planting box. The planting box includes a support frame body including an accommodating cavity, a top cover disposed over an end of the support frame body, a fill light disposed on a side of the top cover facing the support frame body, and a bottom cover disposed on another end of the support frame body. The support frame body including the accommodating cavity, the top cover provided with a suction fan, the fill light, and the bottom cover provided by the planting box ensures an air circulation within the planting box and a lighting requirement for plant growth.

16 Claims, 10 Drawing Sheets

(56) References Cited

U.S. PATENT DOCUMENTS

| 11,304,384 B2 * | 4/2022 | Voelz | A01G 9/249 |
| 2008/0155896 A1 * | 7/2008 | Chen | A01G 9/16 |
| | | | 47/65.5 |

FOREIGN PATENT DOCUMENTS

| CN | 205161415 U | 4/2016 |
| CN | 207783702 U | 8/2018 |
| CN | 209788020 U | 12/2019 |
| CN | 212344702 U | 1/2021 |
| CN | 215301868 U | 12/2021 |
| CN | 219628472 U | 9/2023 |
| CN | 220441449 U | 2/2024 |
| KR | 102262219 B1 | 6/2021 |
| KR | 20210123048 A | 10/2021 |

OTHER PUBLICATIONS

First Office Action in Chinese Application No. 202310141086.9 mailed on Jul. 16, 2025, 28 pages.

* cited by examiner

16

15

17

14

18

11

13

181          18

PLANTING BOXES

CROSS-REFERENCE TO RELATED APPLICATIONS

This application claims priority to Chinese Application No. 202310477700.9, filed on Apr. 28, 2023, Chinese Application No. 202321008649.9, filed on Apr. 28, 2023, Chinese Application No. 202310141086.9, filed on Feb. 21, 2023, and Chinese Application No. 202320264962.2, filed on Feb. 21, 2023, the entire contents of each of which are incorporated herein by reference.

TECHNICAL FIELD

The present disclosure relates to the technical field of plant cultivation, and in particular, to a planting box.

BACKGROUND

People usually plant some decorative plants such as flowers and plants indoors. Plants that have specific temperature requirements need to be planted in a box. However, it is difficult for beginners without any planting experience to keep plants alive, especially for plants that require proper air circulation.

Therefore, it is desirable to provide a planting box that reduces the difficulty of planting.

SUMMARY

One or more embodiments of the present disclosure provide a planting box. The planting box includes a support frame body including an accommodating cavity and a top cover disposed over an end of the support frame body. A suction fan is provided on the top cover, and the suction fan is configured to discharge air in the accommodating cavity. The planting box also includes a fill light disposed on a side of the top cover facing the support frame body and a bottom cover disposed on another end of the support frame body.

In some embodiments, the support frame body includes a plurality of vent holes, and the plurality of vent holes are in communication with the accommodating cavity. The top cover includes a circulation cavity. The planting box further includes a circulation fan. The circulation fan is disposed on the top cover, and the circulation fan is in communication with the plurality of vent holes and the circulation cavity.

In some embodiments, the support frame body includes a plurality of support rods and an enclosure portion. The plurality of support rods extend along a height direction of the planting box, the plurality of support rods are arranged at an interval around the accommodating cavity, and an end of each of the plurality of support rods is connected to the top cover. The enclosure portion is enclosed to form the accommodating cavity. For the each of the plurality of support rods, the support rod includes a hollow flow channel, the plurality of vent holes are provided on the support rod, the plurality of vent holes are in communication with the hollow flow channel, and the circulation fan is connected to the hollow flow channel.

In some embodiments, a connection structure is provided between the support rod and the top cover, and the support rod is connected to the top cover through the connection structure.

In some embodiments, the connection structure includes a first connection cylinder and a second connection cylinder. The first connection cylinder is provided on the top cover, and the second connection cylinder is provided on the support rod. The first connection cylinder is inserted into the second connection cylinder, or the second connection cylinder is inserted into the first connection cylinder.

In some embodiments, the first connection cylinder is provided with a first snap-in slot, the second connection cylinder is provided with a snap-fit, the second connection cylinder is inserted into the first connection cylinder, and the snap-fit is engaged with the first snap-in slot.

In some embodiments, the planting box further includes a locking nail. The locking nail is inserted into the second connection cylinder, the locking nail is provided with an abutting protrusion, and the abutting protrusion is able to abut against the snap-fit such that the snap-fit is in a locked connection with the first snap-in slot.

In some embodiments, the top cover is provided with a locating piece. The locating piece is provided with a locating slot. The second connection cylinder is provided with a locating protrusion. The second connection cylinder is inserted into the first connection cylinder, and the locating protrusion is located in the locating slot.

In some embodiments, the plurality of vent holes are arranged at an interval along an extending direction of the support rod.

In some embodiments, the top cover is provided with an exhaust hole, and the exhaust hole is in communication with the circulation cavity.

In some embodiments, the bottom cover is provided with a locating block, and the support rod is sleeved on the locating block.

In some embodiments, the connection structure further includes a snap-in member, a second snap-in slot, and a locating hole. The second snap-in slot is provided on the top cover, the snap-in member is provided on the top cover and is able to be extended or retracted relative to the second snap-in slot, the locating hole is provided on the support rod, the support rod is inserted into the second snap-in slot, and an end of the snap-in member is capable of being located in the locating hole.

In some embodiments, a shift lever is fixedly provided on the snap-in member. The top cover is provided with a guide slot along a movement direction of the snap-in member, and the shift lever is located in the guide slot.

In some embodiments, the planting box further includes a first zipper structure. The first zipper structure is disposed between the enclosure portion and the top cover, the first zipper structure is disposed along a circumferential direction of the top cover, and the enclosure portion is coupled to the top cover through the first zipper structure.

In some embodiments, the planting box further includes a second zipper structure. The second zipper structure is disposed between the enclosure portion and the bottom cover, the second zipper structure is disposed along a circumferential direction of the bottom cover, and the enclosure portion is coupled to the bottom cover through the second zipper structure.

In some embodiments, the planting box further includes a flowerpot. The flowerpot is placed on the bottom cover. The flowerpot includes a water storage basin and a base plate. The base plate is erected in the water storage basin, and the base plate is surrounded with the water storage basin to form a water storage cavity. The base plate is provided with a water filling port and a water supply tank in communication with the water storage cavity, and the water storage basin is placed on the bottom cover.

In some embodiments, the top cover is provided with a fan and a control module. The control module is electrically connected to the fill light, the fan, the suction fan, and the circulation fan.

In some embodiments, the accommodating cavity is provided with a temperature sensor, a humidity sensor, a liquid level sensor, and a pH sensor. The control module is electrically connected to the temperature sensor, the humidity sensor, the liquid level sensor, and the pH sensor.

BRIEF DESCRIPTION OF THE DRAWINGS

The present disclosure may be further illustrated by way of exemplary embodiments, which may be described in detail by means of the accompanying drawings. These embodiments are not restrictive, in which the same numbering indicates the same structure, wherein.

Figure 1:
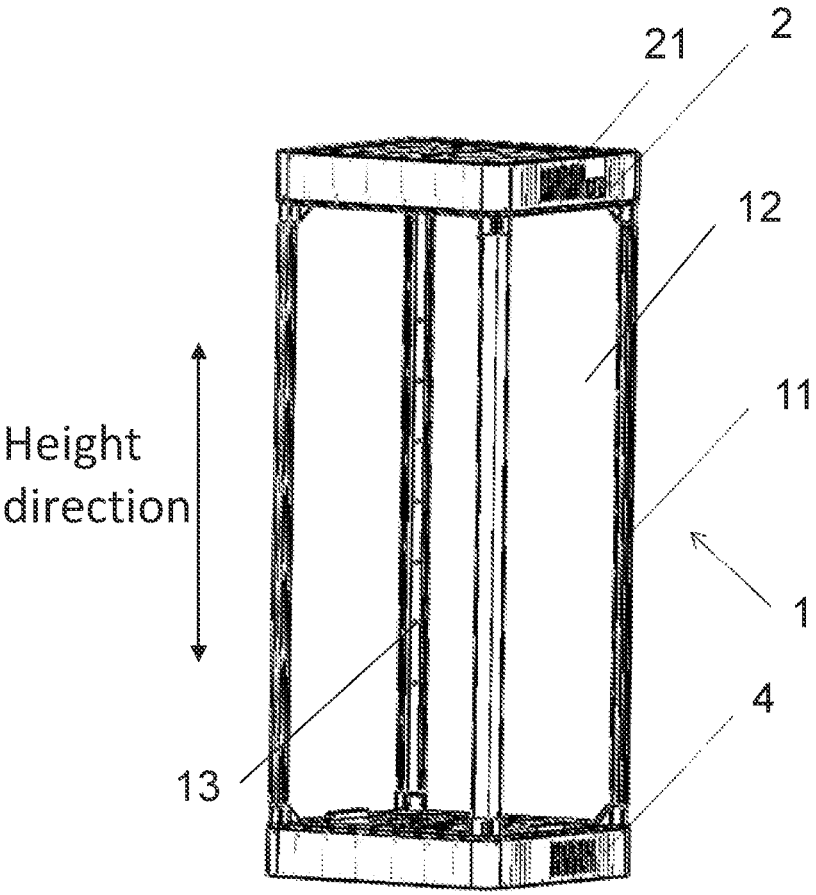
FIG. 1 is a schematic diagram illustrating an exemplary structure of a planting box according to some embodiments of the present disclosure.

Description of markers in the accompanying drawings: 1, support frame body; 11, support rod; 12, enclosure portion; 13, vent hole; 14, hollow flow channel; 15, second connection cylinder; 16, snap-fit; 17, locating protrusion; 18, locking nail; 181, abutting protrusion; 2, top cover; 21, exhaust hole; 22, first connection cylinder; 23, snap-in member; 231, shift lever; 24, second snap-in slot; 25, guide slot; 26, pressure strip; 27, circulation fan; 28, fan; 29, suction fan; 3, fill light; 4, bottom cover; 41, locating block; 5, first zipper structure; 6, second zipper structure; 7, flowerpot; 71, water storage basin; 72, base plate; 721, filling port; 722, water supply tank; 8, temperature sensor; 9, display.

DETAILED DESCRIPTION

In order to more clearly illustrate the technical solutions of the embodiments of the present disclosure, the accompanying drawings to be used in the description of the embodiments will be briefly described below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that "system", "device", "unit" and/or "module" as used herein is a manner used to distinguish different components, elements, parts, sections, or assemblies at different levels. However, if other words serve the same purpose, the words may be replaced by other expressions.

As shown in the present disclosure and claims, the words "one", "a", "a kind" and/or "the" are not especially singular but may include the plural unless the context expressly suggests otherwise. In general, the terms "comprise," "comprises," "comprising," "include," "includes," and/or "including," merely prompt to include operations and elements that have been clearly identified, and these operations and elements do not constitute an exclusive listing. The methods or devices may also include other operations or elements.

Figure 2:
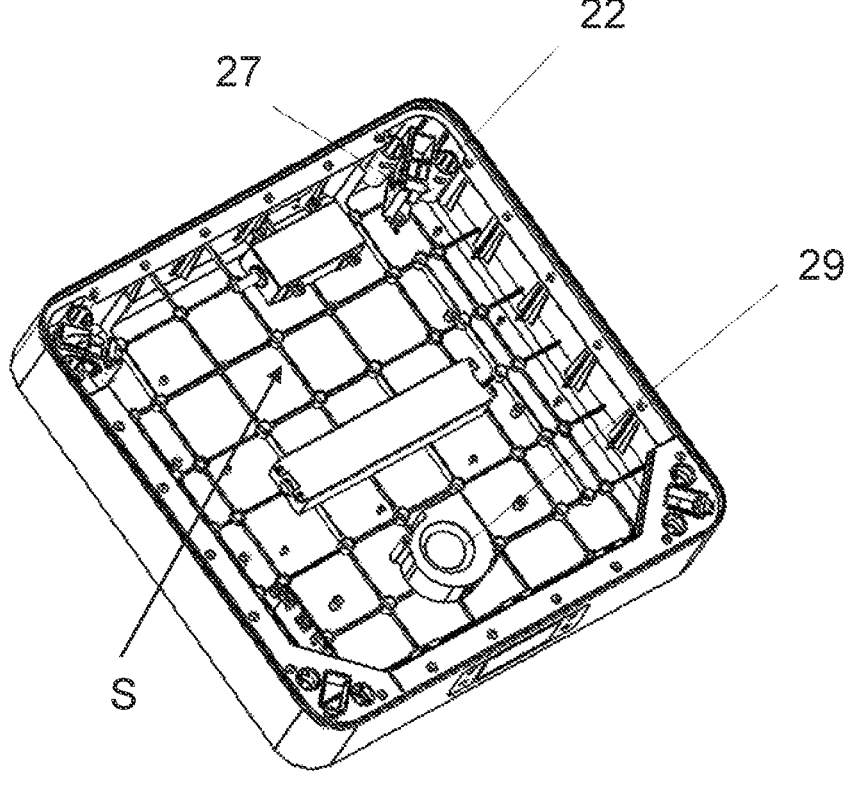
FIG. 2 is a schematic diagram illustrating an exemplary structure of a top cover according to some embodiments of the present disclosure.
Figure 3:
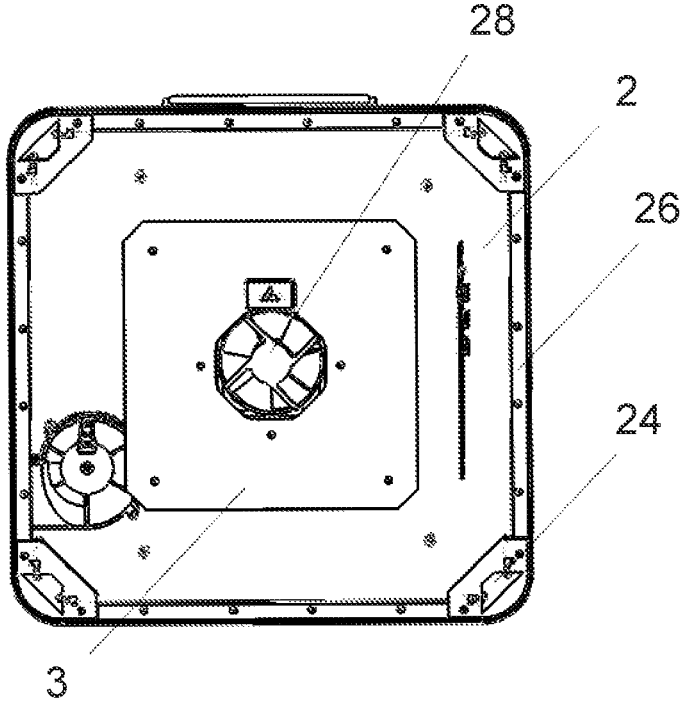
FIG. 3 is a schematic diagram illustrating an exemplary structure of a top cover according to some embodiments of the present disclosure.

FIG. 1 is a schematic diagram illustrating an exemplary structure of a planting box according to some embodiments of the present disclosure. FIG. 2 is a schematic diagram illustrating an exemplary structure of a top cover according to some embodiments of the present disclosure. FIG. 3 is a schematic diagram illustrating an exemplary structure of a top cover according to some embodiments of the present disclosure.

As shown in FIGS. 1-3, some embodiments of the present disclosure provide a planting box including a support frame body 1, a top cover 2, a fill light 3, and a bottom cover 4. The support frame body 1 includes an accommodating cavity. The top cover 2 is disposed over an end of the support frame body 1. A suction fan 29 is provided on the top cover 2, and the suction fan 29 is configured to discharge air in the accommodating cavity. The fill light 3 is disposed on a side of the top cover 2 facing the support frame body 1. The bottom cover 4 is disposed on another end of the support frame body 1.

The support frame body 1 refers to a frame structure used to support other components of the planting box. As shown in FIG. 1, the support frame body 1 includes a hollow accommodating cavity.

The accommodating cavity is a cavity or a space used to store or accommodate objects. In some embodiments, as shown in FIG. 1, the accommodating cavity may be a hollow cavity formed by an enclosure portion 12 surrounding a plurality of support rods 11, which may be used to observe and cultivate plants. In some embodiments, the accommodating cavity may also be a hollow cavity formed by splicing a plurality of support plates based on the plurality of support rods 11.

In some embodiments, a shape and a size of the accommodating cavity may be determined based on actual needs. For example, when a size (e.g., height) of a plant is large, the size of the accommodating cavity may be increased accordingly or the like.

In some embodiments, the support frame body 1 is provided with the plurality of vent holes 13 in communication with the accommodating cavity.

The vent holes 13 are small holes arranged on the support frame body 1. In some embodiments, as shown in FIG. 1, the vent holes may be in communication with the accommodating cavity to ensure air supply and air circulation in a chamber of the accommodating cavity.

A shape of a vent hole 13 is not limited herein and the shape of the vent hole 13 may include, but is not limited to, a square, a circle, an oval, or the like.

In some embodiments, a count of the vent holes 13 and a size of the vent holes 13 may be determined based on actual needs. For example, the count of the vent holes 13 or the size of the vent holes 13 may be increased for a plant with a high air circulation requirement. It should be understood that, the count of the vent holes 13 and the size of the vent holes 13 may also be related to a structural dimension of a location where the vent holes 13 are provided (e.g., the support rod, etc.).

The top cover 2 refers to a structure used to enclose a top of a structure or a component. As shown in FIG. 1, the top cover 2 is disposed over an end of the support frame body 1 for enclosing a top of the accommodating cavity.

In some embodiments, the top cover 2 includes the circulation cavity S.

The circulation cavity S is a cavity or a space configured for air circulation. In some embodiments, air in the accommodating cavity may be circulated and exchanged with the air outside through the circulation cavity S in the top cover 2.

The circulation cavity S may include a hollow cavity in the top cover 2 that is in communication with the outside. In some embodiments, a shape of the circulation cavity S is not limited herein. For example, the shape of the circulation cavity may be a regular or irregular shape such as a square, a rectangle, etc.

In some embodiments, the circulation cavity S may be directly in communication with the outside. For example, the circulation cavity S may be designed as a structure including an opening for connecting with the outside, or the like. In some embodiments, the circulation cavity S may be indirectly in communication with the outside. Merely by way of example, the circulation cavity S may be indirectly in communication with the outside through other structures or devices, such as an exhaust hole, an exhaust fan, an exhaust pump, etc.

In some embodiments, the top cover 2 is provided with an exhaust hole 21, and the exhaust hole 21 is in communication with the circulation cavity S. The exhaust hole 21 refers to a hole for air discharge or air entry.

In some embodiments, the exhaust hole 21 is provided on the top cover 2 and is in communication with the circulation cavity S to realize air exchange in the circulation cavity S with the air outside. For example, the air in the circulation cavity S may be discharged through the exhaust hole 21. As another example, the air outside may enter the circulation cavity S through the exhaust hole 21.

It should be understood that, the air in the circulation cavity S may be discharged to the outside by opening the exhaust hole 21, and air outside may be introduced into the circulation cavity S to realize air exchange in the circulation cavity S with the air outside, so that air replacement in the accommodating cavity may be further realized.

The fill light 3 is apparatus or a device used to supplement light to a plant, such as a fluorescent lamp, a HID lamp, a LED lamp, etc.

In some embodiments, a light requirement for plant growth may be satisfied by controlling an illumination intensity and an illumination duration of the fill light 3.

The bottom cover 4 refers to a structure used to enclose a top of a structure or a component. As shown in FIG. 1, the bottom cover 4 may be used to seal a bottom of the accommodating cavity and to support and fix other members (e.g., the support rod(s)) of the planting box.

More descriptions of the support frame body, the top cover, the fill light, and the bottom cover may be found elsewhere in the present disclosure, such as FIGS. 3-10 and the related descriptions thereof.

In some embodiments of the present disclosure, the support frame body including the accommodating cavity, the top cover provided with a suction fan, the fill light, and the bottom cover provided by the planting box ensures an air circulation within the planting box and a lighting requirement for plant growth.

In some embodiments, the planting box also includes a circulation fan 27. As shown in FIG. 2, the circulation fan 27 is disposed on the top cover 2, and the circulation fan 27 is in communication with the vent holes 13 and the circulation cavity S.

The circulation fan 27 is a device used to circulate air and allow airflow.

In some embodiments, the circulation fan 27 may be combined with an extractor fan 29 to achieve airflow and air exchange inside and outside the planting box.

Merely by way of example, since the circulation cavity S is in communication with the outside through the vent holes 13, the circulation fan 27 is in communication with the circulation cavity S, and the circulation cavity S is in communication with the vent holes 13, and the vent holes 13 are in communication with the accommodating cavity, thus, air in the accommodating cavity may be internally self-circulated through a cooperation between the circulation fan 27 and the extractor fan 29, so as to realize air circulation in the accommodating cavity and air exchange with the air outside.

In some embodiments, a filter component may be provided in the circulation cavity S, and the air may be filtered by the filter component to ensure the cleanliness of the self-circulated air and the cleanliness of air discharged to the outside. The filter component may include but is not limited to, a filter mesh, a filter wool, or the like.

In some embodiments of the present disclosure, the circulation fan 27 in communication with the vent holes and the circulation cavity is provided, and the cooperation between the circulation fan 27 and the extractor fan 29 is achieved to realize air self-circulation in the accommodating cavity of the planting box based on a structural design of the top cover, the support rod, and the circulation fan, so as to avoid that plants in the accommodating cavity have difficulty in growing or even wither due to a lack of air circulation, thus improving a survival rate of the plants.

As shown in FIGS. 1-3, the support frame body 1 may include the plurality of support rods 11 and the enclosure portion 12. The plurality of support rods 11 extend along a height direction of the planting box, and the plurality of support rods 11 are arranged at an interval around the accommodating cavity. An end of each of the plurality of support rods 11 is connected to the top cover 2, the enclosure portion 12 is disposed over the plurality of support rods 11, and the enclosure portion 12 is enclosed to form the accommodating cavity. For each of the plurality of support rods 11, the support rod 11 includes a hollow flow channel 14, the vent holes 13 are provided on the support rod 11, the vent holes 13 are in communication with the hollow flow channel 14, and the circulation fan 27 is in communication with the hollow flow channel 14. The hollow flow channel 14 is a channel in the support rod(s) 11 used for air circulation and airflow.

In some embodiments, the height direction of the planting box is shown by a bi-directional arrow in FIG. 1. It should be understood that, when the planting box is placed on a horizontal table or the ground, the height direction of the planting box is a vertical direction.

A support rod 11 is a rod having a supporting function. A shape of a cross-section of the support rod 11 may include, but is not limited to, a circle, a square, a semi-circle, an L-shape, or the like.

In some embodiments, an end of the support rod 11 may be connected to the top cover 2 to support the top cover 2 in various ways. A connection manner may include a disassembled connection (e.g., a threaded connection, a snap-fit connection, etc.) and a non-disassembled connection (e.g., welding, bonding, etc.).

Figure 4:
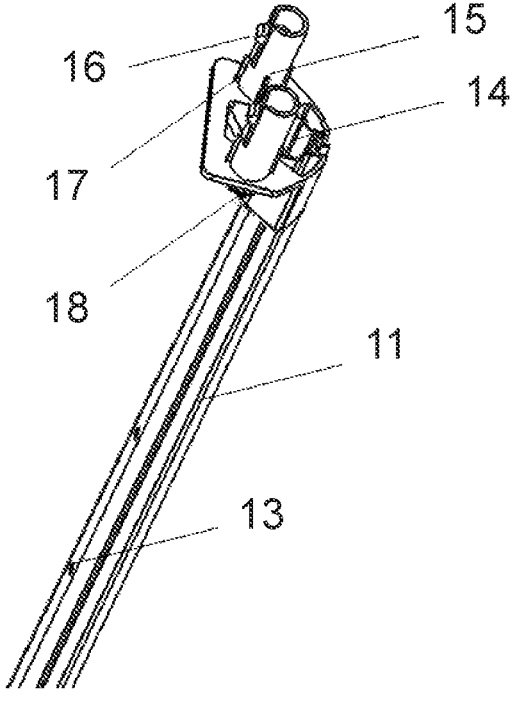
FIG. 4 is a schematic diagram illustrating an exemplary structure of a support rod according to some embodiments of the present disclosure.

As shown in FIG. 1 and FIG. 4, a plurality of vent holes 13 may be arranged at an interval along an extending direction of the support rod(s) 11. The extending direction of the support rod(s) 11 may be considered as the height direction of the planting box.

In some embodiments, air circulation on a side of a plant may be realized by providing the plurality of vent holes 13 on the support rod(s) 11 and blowing air from the circulation cavity S into the hollow flow channel 1 of the support rod(s) 11 through the circulation fan 3, and then discharging the air through the plurality of vent holes 13. Moreover, by providing the plurality of vent holes 13 along the extending direction of the support rod 11, the air in the accommodating cavity is ensured to be discharged from different heights, which may enable the air at different heights to be blown to form a circulation.

In some embodiments, the support rod 11 may be designed as a telescopic rod, and a dimension (e.g., a length) of the support rod 11 may be adjusted based on actual needs. For example, when the plant is relatively high, a length of the support rod 11 may be increased accordingly.

A count of the support rods 11 may be N, and N is an integer greater than 3. In some embodiments, a specific count of the support rods 11 may be determined based on actual needs to provide the support frame body 1 with different shapes, which may be applicable to different scenarios and different placement spaces. Merely by way of example, as shown in FIG. 1, the count of support rods 11 is four, and the support rods 11 are arranged at four corners of the enclosure portion 12 so that the support frame body 1 has a rectangular shape. Cleanliness of the placement space may be ensured to a certain extent by designing the support frame body 1 in a regular shape such as a rectangle.

Figure 8:
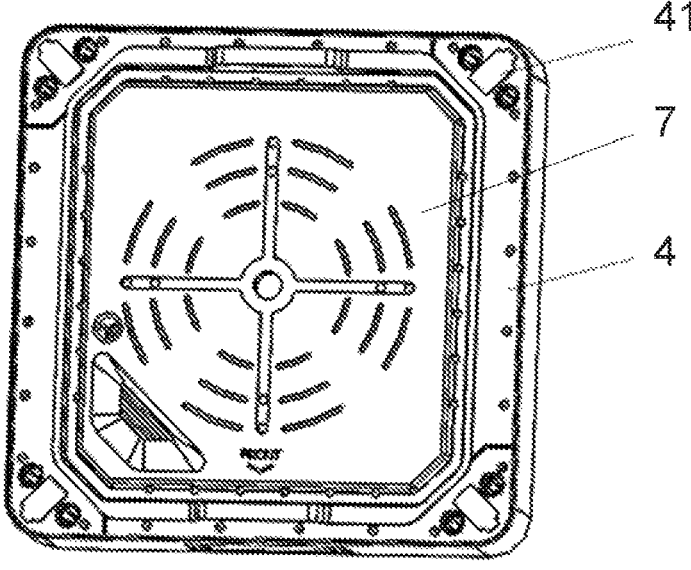
FIG. 8 is a schematic diagram illustrating an exemplary structure of a bottom cover according to some embodiments of the present disclosure.

In some embodiments, the support rods 11 are located at four corners of a quadrilateral, and the enclosure portion 12 is provided to cooperate with the top cover 2 and the bottom cover 4 (as shown in FIG. 8) to form an airtight planting space, which may ensure a temperature for the plants to survive.

In some embodiments, the support rod 11 may be made of an aluminum profile, which is stronger and lighter to allow people to move the planting box. In some embodiments, the support rod 11 may also be made of other materials, such as plastic, composite plastic, etc.

The enclosure portion 12 refers to a structure enclosed to form the accommodating cavity. In some embodiments, the enclosure portion 12 is disposed over the plurality of support rods 11, and the enclosure portion 12 is enclosed to form the accommodating cavity.

In some embodiments, the enclosure portion 12 may be made of non-woven fabric or flexible plastic. In some embodiments, the enclosure portion 12 may also be made of other materials, such as glass, acrylic panels, etc. During a planting process, planting personnel may choose to remove or install the enclosure portion 12 based on planting needs or ornamental needs.

In some embodiments, the enclosure portion 12 may be designed in a plurality of structures so that the enclosure portion 12 may be capable of exchanging air with the outside based on a structure of the enclosure portion 12. For example, the enclosure portion 12 may be provided with a air channel, and the air channel is provided with air holes to realize an air exchange function. As another example, the enclosure portion 12 may be provided with a plurality of air holes, and connected channels are provided between the plurality of air holes to realize the air exchange function.

In some embodiments, the enclosure portion 12 may be a one-piece molded structure. In some embodiments, the enclosure portion 12 may also be a split structure. For example, the enclosure portion 12 may be formed by a combination of at least one sub-enclosure portion. It should be understood that a dimension of the enclosure portion 12 may be determined based on a dimension of an outer contour of a structure enclosed by the plurality of support rods 11.

In some embodiments of the present disclosure, the plurality of vent holes are provided on each of the plurality of support rods, the accommodating cavity is in communication with the hollow flow channel(s) of the support rod(s) through the plurality of vent holes, and the hollow flow channel(s) is in communication with the circulation fan, which is conducive to circulating the air in the accommodating cavity more fully and thoroughly.

Figure 5:
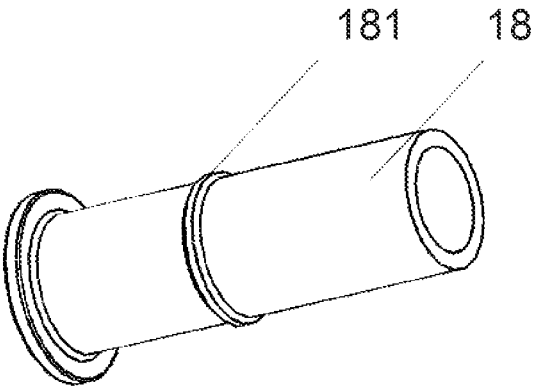
FIG. 5 is a schematic diagram illustrating an exemplary structure of a locking nail according to some embodiments of the present disclosure.

FIG. 4 is a schematic diagram illustrating an exemplary structure of a support rod according to some embodiments of the present disclosure. FIG. 5 is a schematic diagram illustrating an exemplary structure of a locking nail according to some embodiments of the present disclosure.

In some embodiments, a connection structure is provided between the support rod(s) 11 and the top cover 2, and the support rod(s) 11 is connected to the top cover 2 through the connection structure.

In some embodiments, the connection structure provided between the support rod(s) 11 and the top cover 2 may be that the connection structure is provided between each support rod 11 and the top cover 2. In some embodiments, the connection structure provided between the support rod(s) 11 and the top cover 2 may also be in any other feasible form. For example, the connection structure is provided between the support rod(s) 11 at a symmetrical location and the top cover 2, or the like.

The connection structure refers to a structure used to connect two different members or components.

In some embodiments, the connection structure may be designed in a plurality of structural forms. For example, the connection structure may include but is not limited to, a threaded connection structure, a snap-fit connection structure, or the like.

As shown in FIGS. 2-4, the connection structure may include a first connection cylinder 22 and a second connection cylinder 15. The first connection cylinder 22 is fixedly provided on the top cover 2, and the second connection cylinder 15 is fixedly provided on the support rod(s) 11. The first connection cylinder 22 is inserted into the second connection cylinder 15, or the second connection cylinder 15 is inserted into the first connection cylinder 22. A connection cylinder refers to a hollow cylindrical member configured to connect two or more objects.

In some embodiments, the first connection cylinder 22 is provided in correspondence with the second connection cylinder 15. That is, for each first connection cylinder 22 provided on the top cover 2, a corresponding second connection cylinder 15 provided on the support rod(s) 11 is provided. Merely by way of example, the first connection cylinder 22 may be provided on the top cover 2 (e.g., an inside of the top cover 2 or penetrating through the top cover 2), and the second connection cylinder 15 may be provided at an end of the support rod(s) 11. One of the first connection cylinder 22 and the second connection cylinder 15 is inserted into the other one (i.e., the second connection cylinder 15 is inserted into the first connection cylinder 22, or the first connection cylinder 22 is inserted into the second connection cylinder 15), thereby realizing a connection between the support rod(s) 11 and the top cover 2.

In some embodiments, a count of the second connection cylinders 15 may be equal to a count of the support rods 11, and the second connection cylinders 15 correspond to the support rods 11 respectively. A count of the first connection cylinders 22 may be equal to the count of the second connection cylinders 15, and the first connection cylinders 22 correspond to the second connection cylinders 15 respectively. In some embodiments, at least one second connection cylinder 15 may be provided on each support rod 11 to better ensure the stability of the connection between the support rod(s) 11 and the top cover 2.

In some embodiments of the present disclosure, the connection between the support rod(s) 11 and the top cover 2 may be quickly realized by adopting a setting manner of the first connection cylinder 22 and the second connection cylinder 15.

In some embodiments, the first connection cylinder 22 is provided with a first snap-in slot (which is not shown in the figures), the second connection cylinder 15 is provided with a snap-fit 16, the second connection cylinder 15 is inserted into the first connection cylinder 22, and the snap-fit 16 is engaged with the first snap-in slot.

The first snap-in slot is a groove structure used to realize snapping connection. The snap-fit 16 refers to a convex structure used to realize the snapping connection.

In some embodiments, the second connection cylinder 15 may be engaged with the first snap-fit slot through the snap-fit 16 to realize a disassembled connection with the first connection cylinder 22. Merely by way of example, in an installation process, when the second connection cylinder 15 is inserted into the first connection cylinder 22, the snap-fit 16 undergoes elastic deformation until the snap-fit 16 is located at the first snap-in slot, and pops out to be engaged with the first snap-in slot under an action of an elastic restoring force of the snap-fit 16, thereby realizing the connection between the support rod(s) 11 and the top cover 2.

In some embodiments of the present disclosure, the top cover 2 and the support rod(s) 11 may be easier to be connected or disassembled by realizing the snapping connection through the cooperation between the first snap-in slot provided on the first connection cylinder 22 and the snap-fit 16 provided on the second connection cylinder 15 to realize a disassembled connection between the first connection cylinder 22 and the second connection cylinder 15, so as to be applicable in different using scenarios.

As shown in FIGS. 4-5, the planting box may also include a locking nail 18. The locking nail 18 is inserted in the second connection cylinder 15 and is surrounded by an abutting protrusion 181. The abutting protrusion 181 is able to abut against the snap-fit 16, thus, the snap-fit 16 is in a stable locked connection with the first snap-in slot, thereby locking a relative location of the second connection cylinder 15 to the first connection cylinder 22.

The locking nail 18 is an element used to prevent other members or components from loosening or falling off.

In some embodiments, when the locking nail 18 is arranged in place, the snap-fit 16 cannot be disengaged from the first snap-in slot since the abutting protrusion 181 always abuts against the snap-fit 16. Therefore, when performing a disassembled operation, only the locking nail 18 may be moved first, so that the abutting protrusion 181 is disengaged from the snap-fit 16 for offsetting, and then the second connection cylinder 15 may be withdrawn from the first connection cylinder 22, thereby completing a separation of the support rod(s) 11 from the top cover 2.

In some embodiments of the present disclosure, the second connection cylinder 15 may be sealed through the locking nail, thereby ensuring that the first connection cylinder 22 forms a stable connection with the second connection cylinder 15.

Figure 6:
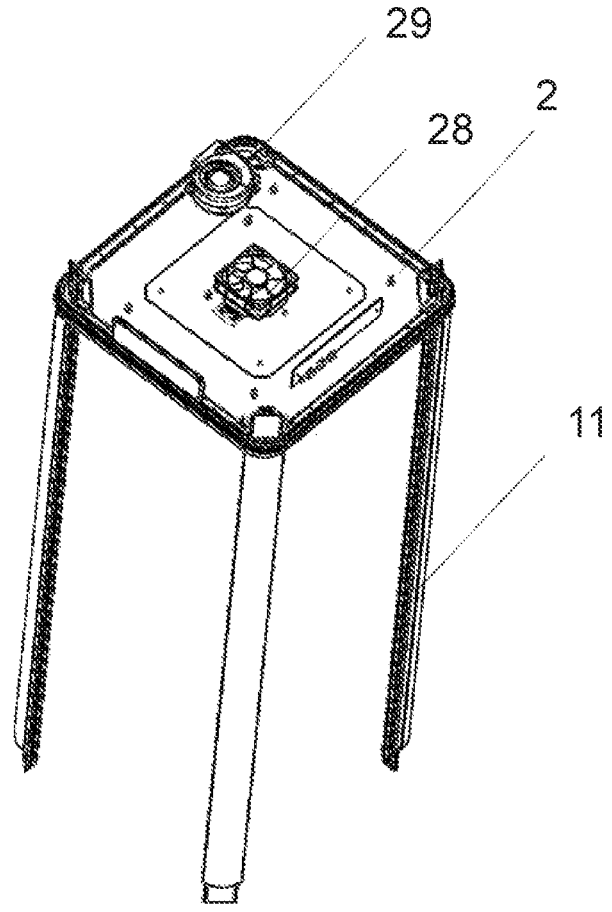
FIG. 6 is a schematic diagram illustrating an exemplary structure of a top cover in cooperation with a support rod according to in some embodiments of the present disclosure.
Figure 7:
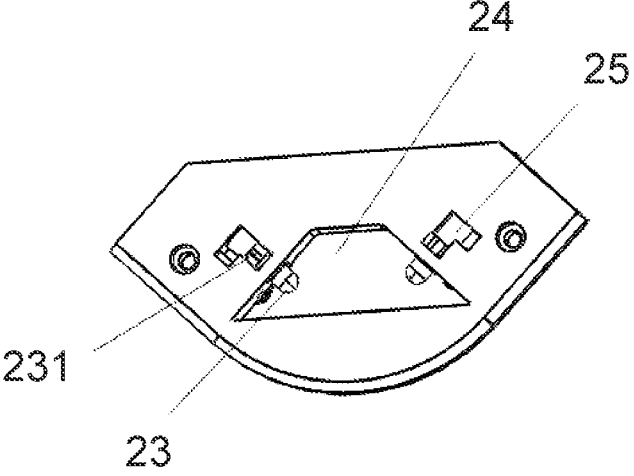
FIG. 7 is a schematic diagram illustrating exemplary structures of a snap-in member, a second snap-in slot, and a shift lever according to some embodiments of the present disclosure.

FIG. 6 is a schematic diagram illustrating an exemplary structure of a top cover in cooperation with a support rod according to in some embodiments of the present disclosure. FIG. 7 is a schematic diagram illustrating exemplary structures of a snap-in member, a second snap-in slot, and a shift lever according to some embodiments of the present disclosure.

As shown in FIGS. 6-7, a connection structure further includes a snap-in member 23, a second snap-in slot 24, and a locating hole (not shown in the figures). A second snap-in slot 24 is provided on the top cover 2, the snap-in member 23 is slidably provided on the top cover 2 and is able to be extended or retracted relative to the second snap-in slot 24. The locating hole is provided on the support rod(s) 11, the support rod (s) 11 is inserted into the second snap-in slot 24, and an end portion of the snap-in member 23 is capable of being located in the locating hole.

Merely by way of example, when installing the support rod(s) 11 and the top cover 2, the support rod(s) 11 may first be inserted into the second snap-in slot 24, and then the snap-in member 23 may be pushed to be inserted into the locating hole, thereby ensuring a stable connection between the support rod(s) 11 and the top cover 2.

In some embodiments of the present disclosure, the top cover and the support rod(s) may be formed into a stable and disassembled connection by using the snap-in member, the second snap-in slot, and the locating hole as the connection structure.

As shown in FIG. 7, the shift lever 231 may also be fixedly provided on the snap-in member 23, a guide slot 25 is provided on the top cover 2 along a movement direction of the snap-in member 23, and the shift lever 231 is located in the guide slot 25.

Merely by way of example, the guide slot 25 may be in a shape of L. A first slot of the guide slot 25 extends along the movement direction of the snap-in member 23, and a second slot of the guide groove 25 is provided perpendicular to the first slot. When the snap-in member 23 is engaged with the support rod(s) 11, the snap-in member 23 is pushed along the first slot of the guide slot 25 through the shift lever 231 so that the end portion of the snap-in member 23 is inserted into the locating hole. When the support rod(s) 11 needs to be unlocked, the snap-in member 23 is pushed backward, the shift lever 231 is located in the second slot of the guide slot 25, a location of the snap-in member 23 is fixed, and the support rod(s) 11 and the top cover 2 may be disengaged from the connection.

In some embodiments, the guide slot 25 may also be designed in other shapes, such as a T-shape or the like.

In some embodiments, to ensure a stable snapping between the support rod(s) 11 and the top cover 2, an elastic member (e.g., a compression spring, etc.) may also be provided between the support rod(s) 11 and the top cover 2. An end of the elastic member abuts against the support rod(s) 11 and another end of the elastic member abuts against the support rod(s) 11. The elastic member has a tendency to make the snap-in member 23 always protrude relative to the second snap-in slot 24.

In some embodiments of the present disclosure, the snap-in member may be more easily manipulated to locate the end portion of the snap-in member in the locating hole by providing the shift lever on the snap-in member and the guide slot along the movement direction of the snap-in member, thereby realizing a connection between the support rod(s) and the top cover.

In some embodiments, the connection structure is also provided between the bottom cover 4 and the support rod(s) 11, which is similar to the connection structure provided between the top cover 2 and the support rod(s) 11, and is not repeated herein.

In some embodiments, the top cover 2 is also fixedly provided with a locating piece (not shown in the figures). The locating piece is provided with a locating slot, the second connection cylinder 15 is provided with a locating protrusion 17, the second connection cylinder 15 is inserted in the first connection cylinder 22, and the locating protrusion 17 is located in the locating slot. The locating piece refers to a structure used to arrange the locating slot. The locating slot may be used to be contacted with the locating protrusion 17 to locate the second connection cylinder 15.

Merely by way of example, the locating piece is directly opposite to the first connection cylinder 22, and the locating protrusion 17 cooperates with the locating slot to achieve the locating of the second connection cylinder 15. Functions of anti-rotation and locating may be achieved by the cooperation between the locating protrusion 17 and the locating slot, thereby facilitating a quick connection between the support rod(s) 11 and the top cover 2.

FIG. 8 is a schematic diagram illustrating an exemplary structure of a bottom cover according to some embodiments of the present disclosure.

As shown in FIG. 8, the bottom cover 4 is provided with a locating block 41. The support rod(s) 11 is sleeved on the locating block 41 to enable a quick locating and connection of the support rod(s) 11.

The locating block 41 refers to a structure used to locate and support an object. In some embodiments, the locating block 41 may be configured to locate, support, and connect the support rod(s) 11.

In some embodiments, a shape of a structure of the locating block 41 is not limited herein, which may be a square, a circular, or any other structure, or the like.

It should be noted that a size of the locating block 41 is not limited herein, which is sufficient to be able to realize mutual cooperation with the support rod(s) 11. That is, the support rod(s) 11 may be able to be sleeved on the locating block 41.

In some embodiments of the present disclosure, the support rod(s) may be quickly located and connected by providing the locating block, thereby facilitating an installation of the support rod(s) on the bottom cover.

Figure 9:
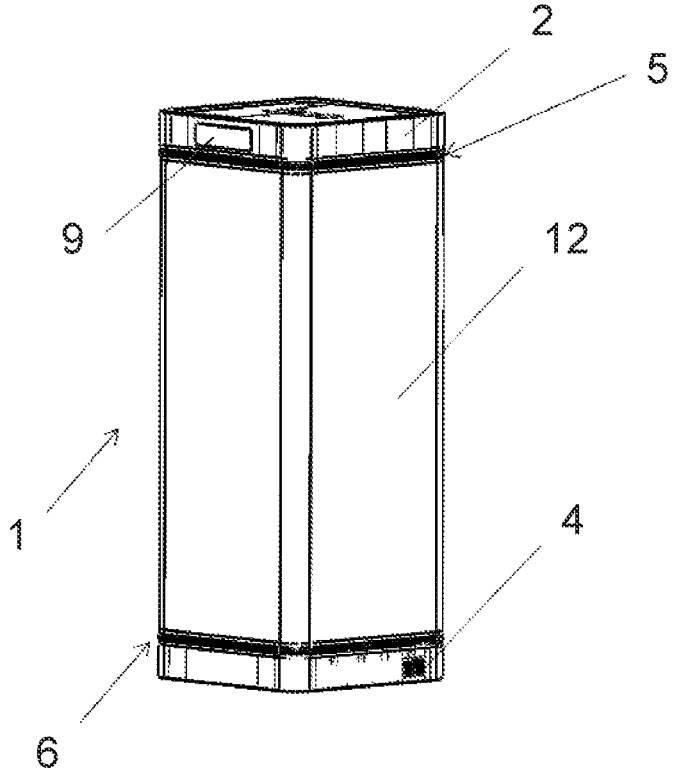
FIG. 9 is a schematic diagram illustrating an exemplary structure of a planting box according to some other embodiments of the present disclosure.

FIG. 9 is a schematic diagram illustrating an exemplary structure of a planting box according to some other embodiments of the present disclosure.

As shown in FIG. 9, the planting box further includes a first zipper structure 5. The first zipper structure 5 is located between the enclosure portion 12 and the top cover 2, the first zipper structure 5 is located along a circumferential direction of the top cover 2, and the enclosure portion 12 is coupled to the top cover 2 through the first zipper structure 5.

A zipper structure is a structure used to quickly and reliably connect two objects or close an opening. In some embodiments, the first zipper structure 5 may be used to connect the enclosure portion 12 and the top cover 2.

Merely by way of example, one of zippers of the first zipper structure 5 is fixedly provided on the enclosure portion 12 along the circumferential direction of the enclosure portion 12, and another zipper of the zippers of the first zipper structure 5 is fixedly provided on the top cover 2. Two zippers are engaged together using a zipper fastener to realize a connection between the enclosure portion 12 and the top cover 2. It should be understood that the enclosure portion 12 and the top cover 2 are easily connected or disassembled by using the first zipper structure 5.

In some embodiments, as shown in FIG. 7, a pressing slot (not shown in the figures) is provided along the circumferential direction of the top cover 2, and the zippers are fixed in the pressing slot through a pressing strip 26. A tooth portion of the zipper(s) protrudes relative to an edge of the top cover 2. By using the pressing strip 26 to fix the zipper(s), it is more convenient for installing the zipper(s).

In some embodiments, the planting box further includes a second zipper structure 6. The second zipper structure 6 is located between the enclosure portion 12 and the bottom cover 4, the second zipper structure 6 is located along a circumferential direction of the bottom cover 4, and the enclosure portion 12 is coupled to the bottom cover 4 through the second zipper structure 6.

In some embodiments, the second zipper structure 6 may be used to connect the enclosure portion 12 to the bottom cover 4.

It should be noted that the second zipper structure 6 is similar to the first zipper structure 5, which is not repeated herein.

It should be understood that, by using the second zipper structure 6, it is more convenient for the enclosure portion 12 to be connected and disassembled from the bottom cover 4.

Figure 10:
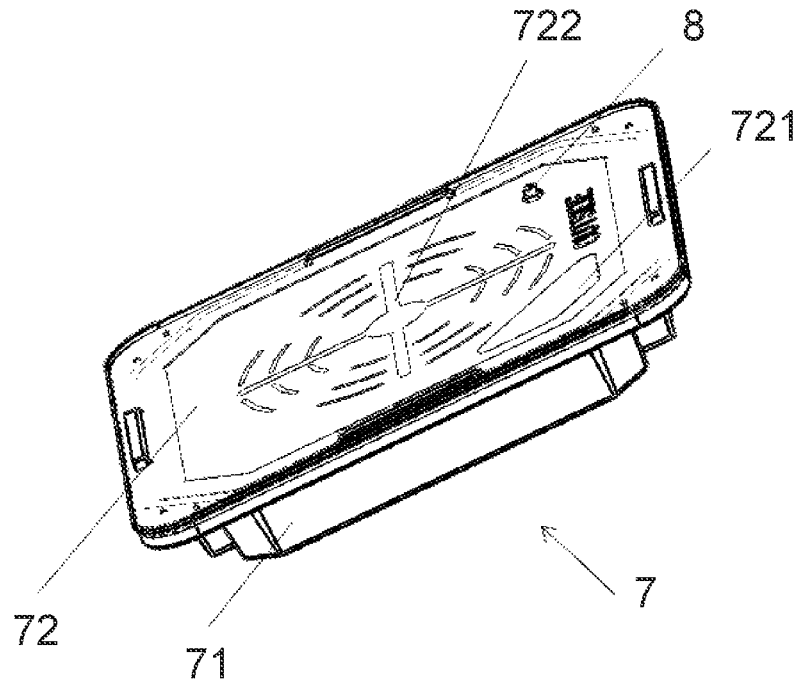
FIG. 10 is a schematic diagram illustrating an exemplary structure of a flowerpot according to some embodiments of the present disclosure.

FIG. 10 is a schematic diagram illustrating an exemplary structure of a flowerpot according to some embodiments of the present disclosure.

As shown in FIG. 10, the planting box further includes the flowerpot 7. The flowerpot 7 is placed on the bottom cover 4, and the flowerpot 7 includes a water storage basin 71 and a base plate 72. The base plate 72 is erected in the water storage basin 71, the base plate 72 is surrounded with the water storage basin 71 to form a water storage cavity, the base plate 72 is provided with a filling port 721 and a water supply tank 722 in communication with the water storage cavity, and the water storage basin 71 is placed on the bottom cover 4.

In some embodiments, plants are planted on the base plate 72, water is absorbed from the water storage cavity through the water supply tank 722 on the base plate 72, and water and fertilizer may be entered into the water storage cavity through the filling port 721.

In some embodiments, the water storage basin 71 may be made of a transparent material (e.g., transparent plastic, etc.)

to allow for better observation of a water level in the water storage cavity, thereby avoiding plant damage or drying out due to lack of water.

In some embodiments of the present disclosure, by designing the base plate to separate the water storage cavity from the plants, water supply to the plants may be ensured, which may effectively avoid the plants drying out due to too little filled water or untimely addition of water, and also avoid the plants being directly soaked in water for a long time, which may cause the plant decay.

As shown in FIG. 2 and FIGS. 6-7, the top cover 2 may also be provided with a fan 28 and a control module (not shown in the figures). The control module is electrically connected to the fill light 3, the fan 28, the suction fan 29, and the circulation fan 27. The electrical connection refers to a connection manner that connects each component based on wires to realize signal transmission, control, and other functions.

The control module is a module used to control other electronic components in the planting box. For example, the control module may include a single chip microcomputer, or the like.

In some embodiments, the control module may control the operation of the fill light 3, the fan 28, the suction fan 29, and the circulation fan 27. For example, the control module may control light intensity and light duration of the fill light 3 based on an actual light requirement for plant growth. As another example, the control module may control a rotating speed of the fan 28, the suction fan 29, and the circulation fan 27 based on an actual ventilation requirement for plant growth.

In some embodiments, the fill light 3 has a heating function, and a temperature of an environment for plant growth may be controlled by controlling the fill light 3 to satisfy growth requirements of the plants adapted to different temperatures. Even when a room temperature is low, the growth requirements of plants requiring higher temperatures to survive may also be satisfied.

It should be understood that, to facilitate control, a corresponding planting APP may also be developed. The APP may communicate with the control module through WIFI, Bluetooth, etc. Planting personnel may perform a corresponding operation according to a reminder (e.g., a reminder of completing illumination, etc.) of planting information in the APP, which may further enhance convenience of planting plants.

In some embodiments of the present disclosure, the plants may be able to be fully engaged in photosynthesis by providing the fill light 3 on the top cover 2, and the fill light 3 may be used to supplement light according to an actual light requirement for plant growth. Moreover, the circulation of air in the planting box may be further ensured by providing the fan 28 and the suction fan 29 on the top cover 2 to cooperate with the circulation fan 27, which effectively ensures a normal growth of the plants.

In some embodiments, as shown in FIG. 10, a temperature sensor 8, a humidity sensor, a liquid level sensor, and a pH sensor may be provided in the accommodating cavity. The temperature sensor, the humidity sensor, the liquid level sensor, and the pH sensor are electrically connected to the control module.

In some embodiments, a temperature, a humidity, a liquid level of the water storage cavity, and a pH value of a planted soil of the planting box may be monitored in real time based on the temperature sensor 8, the humidity sensor, the liquid level sensor, and the pH sensor. Monitoring data is transmitted to the control module, and then the monitoring data is fed back to the APP of the planting personnel for corresponding reminders, so that the planting personnel may take necessary actions in time.

The monitoring data is data collected by each sensor in real time. For example, the monitoring data may include the temperature and the humidity of the planting box, the liquid level of the water storage cavity, and the pH value of the planted soil.

In some embodiments, the control module may process the monitoring data to determine an appropriate planting scheme.

The planting scheme refers to a maintenance scheme for the plants in the planting box. For example, the planting scheme may include one or more of the light intensity and the light duration of the fill light 3, the rotating speed of the fan, the rotating speed of the suction fan, the rotating speed of the circulation fan, an amount and frequency of filling water, a type of fertilizer, or the like.

In some embodiments, based on the monitoring data, the control module may use a plurality of manners to determine the appropriate planting scheme. For example, based on the monitoring data, the control module may determine the appropriate planting scheme by matching a planting scheme with historical data.

In some embodiments, the control module may process the monitoring data and the plant species through a scheme determination model to determine a corresponding planting scheme.

The scheme determination model refers to a model used to determine the appropriate planting scheme based on the monitoring data. In some embodiments, the scheme determination model may be a machine learning model. For example, the scheme determination model may be one or a combination of one or more of a convolutional neural network (CNN) model, a deep neural network (DNN) model, a customized model, or the like.

In some embodiments, an input of the scheme determination model may include the monitoring data and the plant species, and an output of the scheme determination model may include a corresponding planting scheme.

In some embodiments, the scheme determination model may be obtained by training based on a plurality of training samples with labels. The training samples may include sample monitoring data and sample plant species, and the labels may include a planting scheme corresponding to the sample monitoring data and the sample plant species. The training samples may be determined based on historical data and the labels may be determined based on manual labeling, or the like.

In some embodiments, the training samples may be input into an initial scheme determination model, and a parameter of the initial scheme determination model may be iterated through training until a trained model satisfies a preset training condition, so that a trained scheme determination model is obtained. The preset training condition may be that a loss function is less than a threshold, converges, or a training period reaches a threshold. In some embodiments, a manner of iterating the parameter of the model may include a conventional model training manner such as stochastic gradient descent, or the like.

It should be noted that sensors may also be configured according to actual needs to monitor various planting parameters in real time. For example, the planting parameters may include but are not limited to an air temperature, an air humidity, a light intensity, an inner-circulation wind speed, an outer-circulation wind speed, a soil EC value (i.e., soil ion concentration), a soil pH value, a soil water content, a soil temperature, a liquid level of stored water, a temperature of stored water, or the like.

In some embodiments, a camera device (e.g., a camera, etc.) may also be provided in the accommodating cavity. The control module may process the plant images obtained by the camera device and automatically adjust the planting scheme. For example, the control module may perform an image recognition on the plant images, and when plant leaves are recognized to be lighter in color, the light intensity or the light duration of the fill light 3 may be appropriately increased; when the plant leaves are recognized to be withered, the amount of water may be appropriately increased, or the like.

In some embodiments, as shown in FIG. 9, a display 9 electrically connected to the control module may also be provided on the top cover 2, and the display 9 is used to display information such as the temperature, the humidity, the liquid level of the water storage cavity, the soil pH value, or the like, which facilitates the planting personnel to notice the information and take necessary actions.

In some embodiments of the present disclosure, by providing various sensors electrically connected to the control module in the accommodating cavity, obtaining the monitoring data in the planting box in real time, and processing the monitoring data through the scheme determination model, the corresponding planting scheme may be generated quickly and accurately, thereby ensuring accuracy and scientificity of the planting scheme, which may, in turn, ensure the normal growth of the plants.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements, and amendments to the present disclosure. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or feature described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. In addition, some features, structures, or characteristics of one or more embodiments in the present disclosure may be properly combined.

Furthermore, the recited order of processing elements or sequences, or the use of numbers, letters, or other designations therefore, is not intended to limit the claimed processes and methods to any order except as may be specified in the claims. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the invention. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that object of the present disclosure requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes. History application documents that are inconsistent or conflictive with the contents of the present disclosure are excluded, as well as documents (currently or subsequently appended to the present specification) limiting the broadest scope of the claims of the present disclosure. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A planting box, comprising:
   a support frame body including an accommodating cavity, wherein the support frame body includes a plurality of vent holes, the plurality of vent holes being in communication with the accommodating cavity;
   a top cover disposed over an end of the support frame body, wherein a suction fan is provided on the top cover, the suction fan is configured to discharge air in the accommodating cavity, and the top cover includes a circulation cavity;

a fill light disposed on a side of the top cover facing the support frame body;

a bottom cover disposed on another end of the support frame body; and a circulation fan disposed on the top cover, wherein the circulation fan is in communication with the plurality of vent holes and the circulation cavity; wherein the support frame body includes a plurality of support rods and an enclosure portion;

the plurality of support rods extend along a height direction of the planting box, the plurality of support rods are arranged at an interval around the accommodating cavity, and an end of each of the plurality of support rods is connected to the top cover;

the enclosure portion is enclosed to form the accommodating cavity; and for the each of the plurality of support rods, the support rod includes a hollow flow channel, the plurality of vent holes are provided on the support rod, the plurality of vent holes are in communication with the hollow flow channel, and the circulation fan is in communication with the hollow flow channel.

2. The planting box of claim 1, wherein a connection structure is provided between the support rod and the top cover, and the support rod is connected to the top cover through the connection structure.

3. The planting box of claim 2, wherein the connection structure includes a first connection cylinder and a second connection cylinder, the first connection cylinder is provided on the top cover, the second connection cylinder is provided on the support rod, and the first connection cylinder is inserted into the second connection cylinder, or the second connection cylinder is inserted into the first connection cylinder.

4. The planting box of claim 3, wherein the first connection cylinder is provided with a first snap-in slot, the second connection cylinder is provided with a snap-fit, the second connection cylinder is inserted into the first connection cylinder, and the snap-fit is engaged with the first snap-in slot.

5. The planting box of claim 3, further comprising:

a locking nail, the locking nail being inserted into the second connection cylinder, the locking nail being provided with an abutting protrusion, the abutting protrusion being able to abut against the snap-fit such that the snap-fit is in a locked connection with the first snap-in slot.

6. The planting box of claim 3, wherein the top cover is provided with a locating piece, the locating piece is provided with a locating slot, the second connection cylinder is provided with a locating protrusion, the second connection cylinder is inserted into the first connection cylinder, and the locating protrusion is located in the locating slot.

7. The planting box of claim 2, wherein the connection structure further includes a snap-in member, a second snap-in slot, and a locating hole, the second snap-in slot is provided on the top cover, the snap-in member is provided on the top cover and is able to be extended or retracted relative to the second snap-in slot, the locating hole is provided on the support rod, the support rod is inserted into the second snap-in slot, and an end of the snap-in member is capable of being located in the locating hole.

8. The planting box of claim 7, wherein a shift lever is fixedly provided on the snap-in member, the top cover is provided with a guide slot along a movement direction of the snap-in member, and the shift lever is located in the guide slot.

9. The planting box of claim 1, wherein the plurality of vent holes are arranged at an interval along an extending direction of the support rod.

10. The planting box of claim 1, wherein the top cover is provided with an exhaust hole, and the exhaust hole is in communication with the circulation cavity.

11. The planting box of claim 1, wherein the bottom cover is provided with a locating block, and the support rod is sleeved on the locating block.

12. The planting box of claim 1, further comprising:

a first zipper structure, the first zipper structure being disposed between the enclosure portion and the top cover, the first zipper structure being disposed along a circumferential direction of the top cover, and the enclosure portion being coupled to the top cover through the first zipper structure.

13. The planting box of claim 1, further comprising:

a second zipper structure, the second zipper structure being disposed between the enclosure portion and the bottom cover, the second zipper structure being disposed along a circumferential direction of the bottom cover, and the enclosure portion being coupled to the bottom cover through the second zipper structure.

14. The planting box of claim 1, further comprising:

a flowerpot, the flowerpot being placed on the bottom cover, the flowerpot including a water storage basin and a base plate, the base plate being erected in the water storage basin, the base plate being surrounded with the water storage basin to form a water storage cavity, the base plate being provided with a water filling port and a water supply tank in communication with the water storage cavity, and the water storage basin being placed on the bottom cover.

15. The planting box of claim 1, wherein the top cover is further provided with a fan and a control module, and the control module is electrically connected to the fill light, the fan, the suction fan, and the circulation fan.

16. The planting box of claim 15, wherein the accommodating cavity is provided with a temperature sensor, a humidity sensor, a liquid level sensor, and a pH sensor, and the control module is electrically connected to the temperature sensor, the humidity sensor, the liquid level sensor, and the pH sensor.

* * * * *